(12) United States Patent
Kempf et al.

(10) Patent No.: US 6,863,236 B2
(45) Date of Patent: Mar. 8, 2005

(54) ELECTROMAGNETIC SEATBELT ENERGY MANAGEMENT DEVICES

(75) Inventors: Peter C. Kempf, Dexter, MI (US); Barney Bauer, Shelby Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 8 days.

(21) Appl. No.: 10/627,377

(22) Filed: Jul. 25, 2003

(65) Prior Publication Data

US 2005/0017116 A1    Jan. 27, 2005

(51) Int. Cl.$^7$ .................. B60R 22/28; B60R 22/343
(52) U.S. Cl. ................. 242/379.1; 242/381; 280/806; 188/161
(58) Field of Search ............................ 242/379.1, 381, 242/381.5; 280/805, 806, 807; 297/478, 477, 476, 475, 470; 188/161, 162, 163, 164

(56) References Cited

U.S. PATENT DOCUMENTS

| 4,788,463 | A | * | 11/1988 | Layh ..................... 188/161 |
| 5,490,583 | A | * | 2/1996 | Anderson et al. ......... 188/161 |
| 6,186,290 | B1 | | 2/2001 | Carlson |
| 6,290,159 | B1 | * | 9/2001 | Specht et al. ........... 242/379.1 |
| 2004/0074715 | A1 | * | 4/2004 | Johansson et al. ........ 188/161 |

OTHER PUBLICATIONS

What Makes a Good MR Fluid?, J. David Carlson, Presented at the 8th International Conference on Electrorheological (ER) Fluids and Magneto-rheological (MR) Suspensions, Nice, Jul. 19-13, 2001, 8 pp.
Commercial Magneto-Rheological Fluid Devices, D. Carlson, D.M. Catanzarite and K. A. St. Clair, Lord Corporation, Cary, NC 27511, 8 pp.
Permanent-Electromagnetic Systems ("magnetic canacellation"), Engineering Note, Lord Materials Division, Lord Corporation, Cary, NC, 27511, 7 pp.
Rheonitic TM Passenger Protection Systems, web page printout, http://www.rhoeonetic.com/passenger_protection_systems, Apr. 1, 2003, Lord Corporation, 1 p.

* cited by examiner

Primary Examiner—John M. Jullions
(74) Attorney, Agent, or Firm—Lonnie Drayer; Patrick Steinnon

(57) ABSTRACT

An energy management device has a plurality of electromagnets positioned between a shaft and a seatbelt spool. When energized, the electromagnets move radially outwardly to engage the inside surface of a hub of the seatbelt spool. By adjusting the amount of current supplied to the electromagnets, the amount of friction, and thus the amount of energy dissipated, can be controlled. A D-ring can be supported on the cable which goes to a spool so that during a crash the ring moves forward as cable is pulled out of the spool which in turn is braked by the energy management device.

7 Claims, 2 Drawing Sheets

ELECTROMAGNETIC SEATBELT ENERGY MANAGEMENT DEVICES

FIELD OF THE INVENTION

The present invention relates to seatbelts and devices or systems for limiting the loading of the passenger against the restraint of the seatbelt.

BACKGROUND OF THE INVENTION

The evolution of car safety systems has gone from the simple lap seatbelt, followed by shoulder belts, to airbags and other active systems. In particular, the effectiveness of seatbelts can be improved by tightening the seatbelts with automatic seatbelt retractors in the early stages of a crash. As the forces produced by the crash push the vehicle occupants against the seatbelts, systems are available which allow the seatbelt webbing to extend to mitigate maximum crash loads. Such mitigation of maximum loads can result in higher survival rates and reduced injuries. Known mechanisms are relatively simple and involve stretching of the seatbelt webbing and the use of energy absorbing structure such as the shear shaft contained within the seatbelt webbing take-up spool. Modern methods of design, simulations, and crash testing have allowed the development of computer models and databases that can be used as design tools. These design tools are used to predict the injury which a vehicle occupant might be expected to suffer in a crash of a given magnitude with the safety systems of a particular design. Typically, the designer works with the parameters of available safety systems to try and optimize their functionality during a crash. However, a vehicle crash by its nature is to some extent an unpredictable event. The loads to which a vehicle's occupants are subjected vary dramatically between different crash scenarios. The designer's objective is to build a system which functions best in the majority of cases.

Typically the designer can specify various parameters of the safety system, such as the amount the seatbelts are retracted, the size and energy dissipation profile of energy absorbing mechanisms which allow the seatbelts to extend under load, the velocity, placement, and the timing and logic of airbag deployment. However, once selected, the options for control during a particular crash are usually limited to deciding whether or not to deploy various systems based on sensor data. So, for example, if the crash is below a certain threshold the airbags may not be deployed, or the seatbelt retractors may not be activated. Recently airbags have been given the capability of varying the force with which they deploy, sometimes by having two stages, sometimes by having venting systems. Such capabilities allow the safety system to respond to the situation created by a particular crash as opposed to designing a system to respond generally to all possible crashes. What is needed are energy management devices for seatbelts that can be continually adjusted as a crash event is occurring.

SUMMARY OF THE INVENTION

The energy management device of this invention comprises a plurality of electromagnets positioned about a shaft that is mounted inside a seatbelt spool. The shaft is fixedly mounted, and the electromagnets, when energized, are repelled from the central shaft radially outwardly to engage the inside surface of a hub of the seatbelt spool. A high friction surface treatment of the inside surface of the hub and the outwardly facing surface of the electromagnets resists rotation of the hub over the electromagnets. The electromagnets are held against displacement by a series of radially extending ribs extending from the fixed shaft. By adjusting the amount of current supplied to the electromagnets, the amount of friction, and thus the amount of energy dissipated, can be controlled. This ability to control the amount of energy dissipated can be used to configure the energy management device to a particular vehicle or seatbelt position, and to adjust the energy management device in real-time in response to sensor inputs during the crash.

In an alternative embodiment the energy management device can be used as an energy dissipation device with respect to movement of a D ring which supports a shoulder belt.

It is a feature of the present invention to provide an energy management device where the level of energy dissipation can be controlled electronically.

It is a further feature of the present invention to provide an energy management device where the level of energy dissipation is varied in real time in response to sensor inputs.

Further features and advantages of the invention will be apparent from the following detailed description when taken in conjunction with the accompanying drawings.

DETAILED DESCRIPTION OF THE INVENTION

Figure 1:
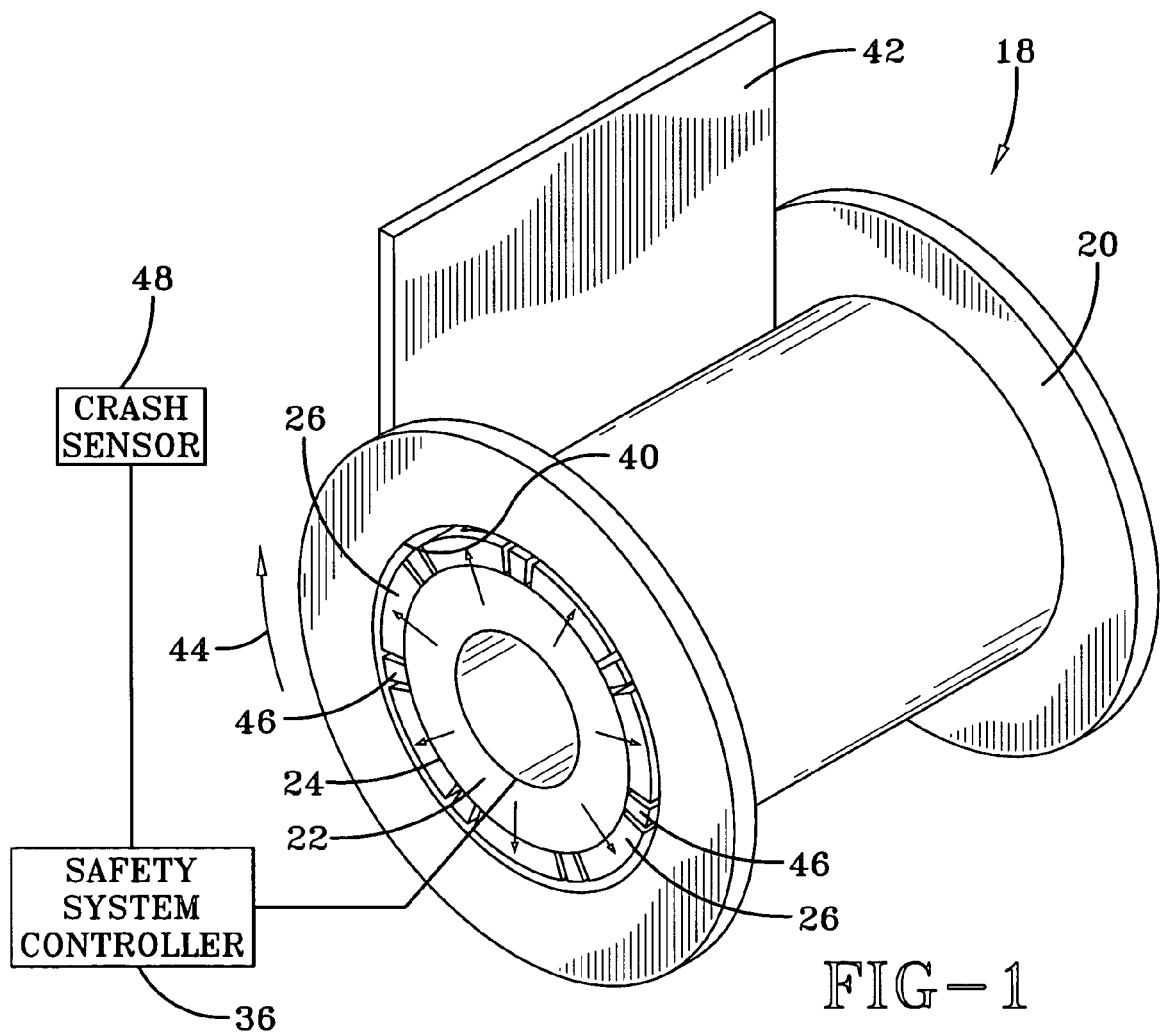
FIG. 1 is schematic isometric view of the seatbelt payout spool incorporating the energy dissipation device of this invention.
Figure 2:
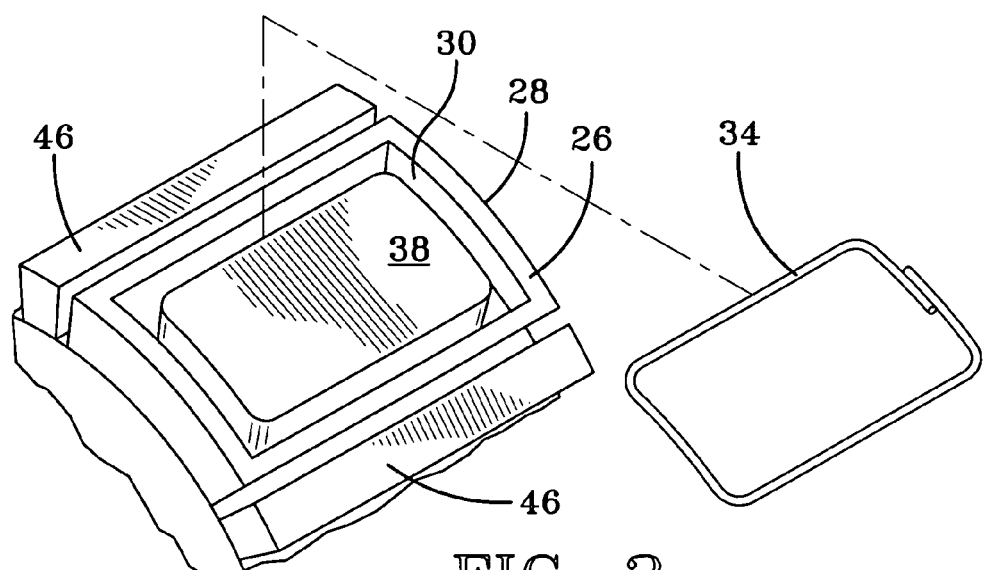
FIG. 2 is an enlarged fragmentary isometric view, partially exploded, of a portion of the energy dissipation device of FIG. 1.
Figure 3:
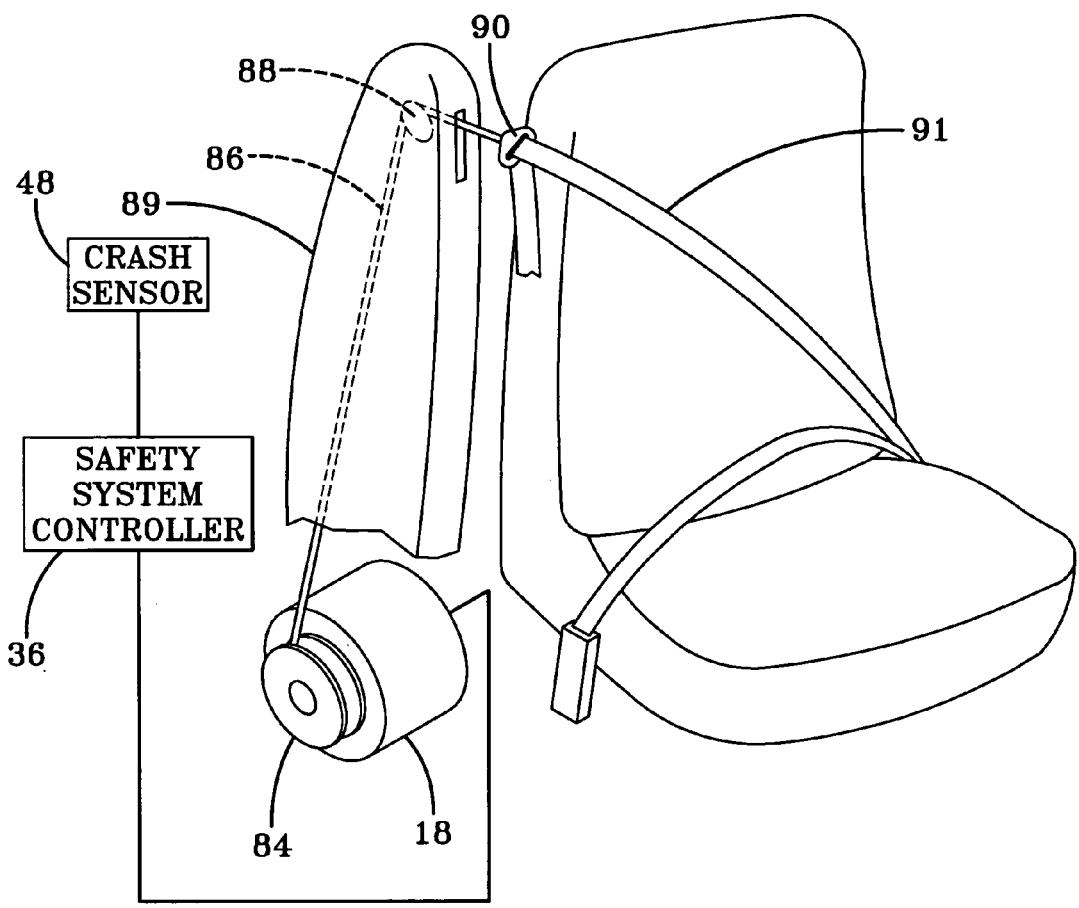
FIG. 3 is a schematic isometric view of the application of an energy dissipation device mounted in a B pillar which allows forward movement of a D ring which supports a shoulder belt.

Referring more particularly to FIGS. 1-3, wherein like numbers refer to similar parts, an energy management device 18 houses a seatbelt spool 20 as shown in FIG. 1. The seatbelt spool 20 is mounted about a fixed shaft 22. About the outer surface 24 of the fixed shaft are positioned a plurality of electromagnets 26, best shown in FIG. 2. Each electromagnet 26 has a magnetic pole piece 28 which has a rectangular groove 30 formed in the upper radial surface 32. An magnetic coil 34 is wound within the rectangular groove 30. The magnetic coil 34 in each of the electromagnets 26 is energized by electrical current supplied from a safety system controller 36. The electromagnets 26 are repelled from the central fixed shaft 22 bringing the upper surfaces 38 of the electromagnets 26 into engagement with the inside surface 40 of the spool 20.

A seatbelt 42 is wrapped around the spool 20 and extends to restrain a vehicle occupant during a crash in which an occupant (not shown) moves against the seatbelt 42. The seatbelt tension causes the spool 20 to rotate in the direction indicated by arrow 44. Rotation of the spool 20, and thus pay out of the seatbelt 42, is controlled by creating a braking action between the seatbelt spool 20 and the fixed shaft 22 by means of the electromagnets 26. The electromagnets 26 are held against rotation with respect to the fixed shaft 22 by ribs 46 that extend radially outwardly from the fixed shaft 22. The frictional engagement between the upper surfaces 38 of the electromagnets 26 and the inside surface 40 of the spool 20 may be enhanced by using an aggressive surface, or other surface features or treatments which can increase the coefficient of friction. A greatly increased coefficient of friction allows the total outward pressure produced by the electromagnets 26 to be substantially less than the torque imposed on the spool 20 by the seatbelt 42.

Because the braking action and thus the energy dissipation mechanism formed by the electromagnets 26 acting against the spool 20 can be modulated, a safety system controller 36 can acquire inputs from crash sensors 48. The inputs from the crash sensors 48 can be utilized with the inputs based on preprogrammed algorithms to control the energy dissipation with a real time profile which is most optimal for limiting loads to which the vehicle occupant is subjected during a crash. For example the load on a seatbelt may be increased linearly for a time and then held constant, or the load may increase linearly for a time, then held constant, then decreased linearly, and then be held constant at a lower value.

FIG. 3 shows the use of the energy management device 18 connected to a spool 84 on which is wound a quantity of cable 86. The cable 86 extends over a pulley 88 in the B-pillar 89 of an automobile (not shown) to support a D ring 90 through which a shoulder belt 91 passes. When the seatbelt 91 is loaded during a crash, the D ring 90 pulls cable 68 from the spool 84 mounted to the energy management device 18. Again, the energy management device 18 is connected to a safety system controller 36 which can control the amount of braking action by supplying current to the magnetic coil 34 illustrated in FIG. 2.

It is understood that the invention is not limited to the particular construction and arrangement of parts herein illustrated and described, but embraces all such modified forms thereof as come within the scope of the following claims.

We claim:

1. An energy management device for a vehicle seatbelt comprising:
    a seatbelt spool, and a portion of a seatbelt wound on the seatbelt spool;
    a stationary member;
    a magnetic member movable by at least one magnetic coil, relative to the stationary member for causing a frictional engagement between the stationary member and the seatbelt spool;
    a safety system controller electrically connected to energize the at least one magnetic coil; and
    at least one sensor connected in data transmitting relation to the safety system controller;
    wherein the seatbelt spool has an internal cylindrical surface, and the at least one magnetic coil is part of an electromagnet which is repelled from the stationary member towards the seatbelt spool internal cylindrical surface to frictionally engage said internal cylindrical surface.

2. The device of claim 1 and further comprising a plurality of magnetic members each containing a magnetic coil electrically connected to the safety system controller, the plurality of electromagnets positioned circumferentially about the stationary member and radially inwardly of the seatbelt spool internal cylindrical surface and movable by said magnetic coil, relative to the stationary member for causing a frictional engagement between the stationary member and the seatbelt spool.

3. The device of claim 2 wherein portions of the stationary member form ribs which prevent the plurality of electromagnets from sliding along the stationary member.

4. An energy management device for a vehicle seatbelt comprising:
    a spool, and a cable wound on the spool mounted for rotation with respect to a stationary member;
    a seatbelt;
    a member through which the seatbelt passes, wherein the cable is connected to the member, so the vehicle occupant can move forward against the seatbelt by a motion of the member which unwinds cable from the spool;
    a magnetic member movable by at least one magnetic coil, relative to the stationary member for causing a frictional engagement between the stationary member and the spool; and
    a safety system controller electrically connected to the magnetic coil to energize the at least one magnetic coil;
    at least one sensor connected in data transmitting relation to the safety system controller;
    wherein the seatbelt spool has an internal cylindrical surface, and the at least one magnetic coil is part of an electromagnet which is repelled from the stationary member towards the seatbelt spool internal cylindrical surface to frictionally engage said internal cylindrical surface.

5. The device of claim 4 wherein the seatbelt is a shoulder belt, and the cable extends over a pulley mounted to the B-pillar of automobile to support the ring through which the shoulder belt passes.

6. The device of claim 5 wherein a plurality of electromagnets each containing a magnetic coil electrically connected to the safety system controller, and which are positioned circumferentially about the stationary member and radially inwardly of the seatbelt spool internal cylindrical surface.

7. The device of claim 6 wherein portions of the stationary member form ribs which prevent the plurality of electromagnets from sliding along the stationary member.

* * * * *